United States Patent
Kumar et al.

(10) Patent No.: US 10,735,208 B2
(45) Date of Patent: Aug. 4, 2020

(54) FUTURE CERTIFICATE REVOCATION USING CRL

(71) Applicant: Nokia Solutions and Networks Oy, Espoo (FI)

(72) Inventors: Shekhar Kumar, Jharkhand (IN); Juergen Opschroef, Straelen (DE); Martin Karl Peylo, Espoo (FI); Giangiacomo Guglielmini, Ulm (DE); Michal Szymanski, Warsaw (PL)

(73) Assignee: Nokia Solutions and Networks Oy, Espoo (FI)

( * ) Notice: Subject to any disclaimer, the term of this patent is extended or adjusted under 35 U.S.C. 154(b) by 26 days.

(21) Appl. No.: 15/555,267

(22) PCT Filed: Mar. 2, 2015

(86) PCT No.: PCT/EP2015/054317
§ 371 (c)(1),
(2) Date: Sep. 1, 2017

(87) PCT Pub. No.: WO2016/138931
PCT Pub. Date: Sep. 9, 2016

(65) Prior Publication Data
US 2018/0351751 A1    Dec. 6, 2018

(51) Int. Cl.
*G06F 21/00* (2013.01)
*H04L 9/32* (2006.01)
(Continued)

(52) U.S. Cl.
CPC .......... *H04L 9/3268* (2013.01); *H04L 9/0825* (2013.01); *H04L 9/0891* (2013.01);
(Continued)

(58) Field of Classification Search
CPC . H04L 63/064; H04L 63/0823; H04L 9/0825; H04L 9/0891; H04L 9/3268; H04L 9/3265
See application file for complete search history.

(56) References Cited

U.S. PATENT DOCUMENTS 7,275,155 B1 *   9/2007   Aull ........................ H04L 9/00
                                                    713/157
7,653,810 B2     1/2010   Thornton et al. ............. 713/158
(Continued)

FOREIGN PATENT DOCUMENTS

WO    WO 2016026536 A1    2/2016

OTHER PUBLICATIONS

3GPP TS 33.310 V12.2.0 (Sep. 2014); "3rd Generation Partnership Project; Technical Specification Group Services and System Aspects; Network Domain Security (NDS); Authentication Framework (AF) (Release 12)", 56 pages.

(Continued)

*Primary Examiner* — Kendall Dolly
(74) *Attorney, Agent, or Firm* — Harrington & Smith

(57) ABSTRACT

It is provided a method, including checking if an indication is received that a certificate installed in a communication entity is to be revoked at a revocation time in the future; preparing, if the indication is received, a first revocation list, wherein the first revocation list includes an identifier of the certificate and the revocation time; providing the first revocation list to the communication entity.

16 Claims, 10 Drawing Sheets

(51) Int. Cl.
*H04L 29/06* (2006.01)
*H04L 9/08* (2006.01)

(52) U.S. Cl.
CPC .......... *H04L 9/3265* (2013.01); *H04L 63/064* (2013.01); *H04L 63/0823* (2013.01)

(56) References Cited

U.S. PATENT DOCUMENTS

| | | | | |
|---|---|---|---|---|
| 10,069,634 | B2* | 9/2018 | Tseng ................. | H04L 9/3265 |
| 2004/0111607 | A1* | 6/2004 | Yellepeddy .......... | H04L 9/3255 |
| | | | | 713/155 |
| 2004/0148505 | A1* | 7/2004 | Qiu ..................... | G06F 21/33 |
| | | | | 713/175 |
| 2006/0112419 | A1* | 5/2006 | Brown ................ | H04L 63/0428 |
| | | | | 726/5 |
| 2008/0126378 | A1* | 5/2008 | Parkinson ............ | G06F 21/33 |
| 2008/0134309 | A1 | 6/2008 | Qin et al. ............. | 726/6 |
| 2008/0301439 | A1* | 12/2008 | Hashimoto .......... | H04L 63/06 |
| | | | | 713/156 |
| 2014/0149740 | A1* | 5/2014 | Sato .................... | H04L 9/006 |
| | | | | 713/158 |
| 2014/0289512 | A1 | 9/2014 | Tseng et al. ......... | 713/158 |
| 2016/0034693 | A1* | 2/2016 | Takeuchi ............. | G06F 21/602 |
| | | | | 713/189 |

OTHER PUBLICATIONS

C. Adams et al; RfC 4210, "Internet X.509 Public Key Infrastructure Certificate Management Protocol (CMP)"; Network Working Group; Sep. 2005, 95 pages.

D. Cooper et al; RfC 5280, "Internet X.509 Public Key Infrastructure Certificate and Certificate Revocation List (CRL) Profile"; Network Working Group; May 2008, 151 pages.

T. Kause et al; RfC 6712, "Internet X.509 Public Key Infrastructure—HTTP Transfer for the Certificate Management Protocol (CMP)"; IETF; Sep. 2012, 10 pages.

"X509CRL (5.2 API Documentation)", Jan. 20, 2014, https://web.archive.org/web/20140120161348/http://javadoc.iaik.tugraz.at/iaik_jce/current/iaik/x509/X509CRL.html; 25 pgs.

* cited by examiner

FUTURE CERTIFICATE REVOCATION USING CRL

FIELD OF THE INVENTION

The present invention relates to an apparatus, a method, and a computer program product related to secure communication. More particularly, the present invention relates to an apparatus, a method, and a computer program product related to public key infrastructure.

BACKGROUND OF THE INVENTION

Abbreviations

3GPP 3rd Generation Partnership Project
CA Certificate Authority
cert Certificate
CMP Certificate Management Protocol (as in RFC 4210)
CRL Certificate Revocation List
EDGE Enhanced Data rates for GSM Evolution
EE End Entity
E-UTRAN Evolved UTRAN
GPRS Generic Packet Radio Service
GSM Global System for Mobile Communication
HTTP Hypertext Transfer Protocol
IETF Internet Engineering Task Force
IPsec Internet Protocol Security (a security protocol by the IETF)
KUR Key Update Request (a CMP message)
LTE Long Term Evolution
LTE-A LTE Advanced
NE Network Element
O&M Operations & Maintenance
PKI Public Key Infrastructure
RA Registration Authority
RFC Request For Comments (a document containing amongst others proposed IETF standard)
SN Serial Number
SSL Secure Socket Layer
TA Trust Anchor
TS Technical Specification (a document containing 3GPP standards)
TLS Transport Layer Security (a security protocol by the IETF)
UMTS Universal Mobile Telecommunications System
WiFi Wireless Fidelity
WLAN Wireless Local Area Network A certificate based authentication framework, also known as PKI, is used in many fixed and mobile networks. Amongst other use cases, PKI frameworks are used for authentication for IPsec and TLS/SSL connections. In order to enable NEs to establish secure TLS or IPsec connections with each other, End Entity (EE) certificates and related trust anchor (TA) certificates (optionally also intermediate CA certificates) are required to be installed in the NEs. In large networks, certificate management can be automated by using the certificate management protocol (CMP).

As shown in FIG. 1, there is a hierarchy of certificates. Each entity (trust anchor (TA), intermediate CA (CA1, if available), and end entity (EE1)) has one or more key pairs, wherein each key pair comprises a private key and a public key. TA digitally signs some set of data (which typically consists of a public key and some metadata such as serial number, validity period, issuer name, subject name, key usage, optional extensions etc) by using a hash to create a digest over this set of data which is then encrypted with its own private key abc. It results in a TA self-signed certificate ABC. The certificate has a serial number such as SN 1. The intermediate CA has a private key CA1. Its public key and metadata are signed by upper-level TA, which is superior to CA in the PKI hierarchy. Thus, a CA1 certificate with e.g. SN=800 is created which is signed by TA.

Correspondingly, the EE has a private key EE1. An EE1 certificate with e.g. SN=1300 is obtained which is signed by CA1.

FIG. 2 is a legend explaining the notations used in the figures. As can be seen on the left side of FIG. 2, the box represents a subject with a subject name (e.g. TA 1) on which a certificate with serial number (e.g. sn100) is installed. The certificate is based on a pair of private and public keys (e.g. k100). Arrows represent certificates, regardless if they are a part of a circle (self-signed certificate) or if they are straight (signed by an upper-level entity such as CA for an EE cert).

As can be seen on the right side of FIG. 2, plural certificates (e.g. sn100 to sn400) may be installed on a subject. Furthermore, the subject may have plural key pairs (e.g. k100 and k200). Each key pair may be comprised in plural certificates. E.g., both certificates sn100 and sn200 comprise key pair k100, and both certificates sn300 and sn400 comprise key pair k200.

On the right side of FIG. 2, a PKI hierarchy is shown, too. That is, a key pair (e.g. k300) and related meta data on the intermediate CA 1 are certified by TA1 by means of digital signature using its private key (e.g. k100).

FIG. 3 explains signing and distributing of keys according to CMP protocol. On the left top side the enrolment of EE certificate is shown. Namely, EE sends CMP IR (Initial Request) with the certificate signing request containing EE public key and its metadata to be certified by CA. In response, CA provides by CMP IP (Initial Response) message the signed EE certificate with the intermediate CA certificate and the TA certificate. The last two messages are confirmation messages.

As shown on the right top part of FIG. 3, if EE requests a key update, e.g. because the EE certificate is going to expire, it sends CMP KUR message. The public key may be the same as the public key of IR or different (newly generated key pair). CA responds by sending CMP KUP message which comprises the updated signed EE certificate and the intermediate CA certificate. The last two messages are confirmation messages.

According to a recent patent application PATL1, in case of expiry of TA certificate, CA provides, in response to CMP KUR, in addition to the signed EE certificate and the intermediate CA certificate a new TA certificate (as shown on the left bottom part of FIG. 3). For seamless transition, KUR is triggered twice in this case, wherein the second KUR is triggered on the expiry of the EE certificate received at $1^{st}$ KUR. FIG. 4 is a schematic diagram illustrating a general network deployment in which a secure connection is established between end entity A and end entity B. Both end entities are provided with a common trust anchor (TA), and each end entity has a certificate which is respectively signed with the private key related to the common trust anchor's certificate.

The certificates used in networks often need to be updated due to various reasons much before their usual expiry period. Though CMP allows for automatic certificate requests, signing and deployment, triggers for starting unscheduled updates to EEs still need to be explicitly signalled from external (e.g. from network element management entities) and are not handled within by means native to native PKI protocols and constructs. This requires a decent amount of manual intervention and efforts.

3GPP TS 33.310 describes the use of CMP for automation of PKI rollout in mobile networks. After the first rollout of certificates to EEs in a network, there is a continuous need for management, e.g. for scheduled and unscheduled certificate updates.

Scheduled certificates updates usually take place in a pre-determined period of time before a certificate expires and are therefore relatively simple to manage by pre-configuring the EEs to request new certificates triggered by an algorithm based on expiry time stated in the X.509 certificates. Unscheduled certificate updates however raise the problem how to communicate a trigger for the update to the EEs, as the PKI system usually has no means to directly contact them.

Reasons for an unscheduled certificate update might include:
1. Change of cryptographic keys
2. Change in certificate parameters
3. Merger/Acquisitions of two companies that require split/merge of the security domains 3GPP specifies delivery of the Trust Anchor to the End Entity as part of the initial bootstrapping into the PKI using the IP (Initialization Response) message of the CMP protocol. The current 3GPP specification however does not enable any Trust Anchor update procedure, as specified in e.g. RFC4210, chapter 5.3.13 (CA Key Update Announcement). The current practice usually involves manual intervention from the operators, partially defeating the purpose of having complete automation of PKI rollout. The problem is further compounded by the fact that, in a big network, it is not feasible to migrate all End Entities to using a new Trust Anchor at the very same point in time. This can create severe interoperability issues between the EEs intended to be peers connected by a secure connection. FIG. 5 illustrates this issue.

FIG. 5 is a schematic diagram illustrating a risk of connection loss in a general network deployment. In particular, in the network deployment in FIG. 5 a secure connection between end entity (peer) A and end entity (peer) B is broken.

Namely, while peer A is already provided with a new trust anchor and accordingly with a new end entity certificate (EEA's certificate) signed with the private key related to the new trust anchor's certificate, peer B is still provided with the old trust anchor, and its end entity certificate (EEB's certificate) is signed with the private key related to the old trust anchor's certificate.

In particular, if a new TA with a new EE certificate is installed at peer A, the secure connection might be broken when
  peer A automatically re-establishes the secure connection triggered by the installation of the new certificates, or when
  peer A or peer B performs a rekey with authentication.
In that case the secure connection cannot be established, because peer B does not possess and utilize the new TA yet.

It needs to be noted that premature expiry of higher-level PKI certificates also may (but not necessarily if an alternative valid certificate chain is available) result in the lower-level certificates becoming effectively invalid. If a TA certificate is updated also the Intermediate CA and/or EE certificates signed by it may need to be updated. If an Intermediate CA certificate is updated also the lower-level Intermediate CA and/or EE certificates signed by it may need to be updated.

The following existing methods are known for Trust Anchor update:

Existing Method A: Manual Installation

This approach is used most commonly in 3GPP networks for Trust Anchor update. It involves manual offline installation of the new Trust Anchor on all the nodes. The procedure can also be used for updating EE and Intermediate CA certificates Comments on the Existing Method a.) No new implementation needed
b.) Needs manual intervention
c.) Difficult to maintain as each individual node's situation needs to be monitored Existing Method B: CMP Announcement by CA According to RFC4210, chapter 5.3.13, CA Key Update Announcement Content:—"When a CA updates its own key pair, the following data structure [CAKeyUpdAnnContent] MAY be used to announce this event.". This procedure is currently only specified for TA update.

CAKeyUpdAnnContent ::=SEQUENCE {oldWithNew Certificate, newWithOld Certificate, newWithNew Certificate}

FIG. 6 is a schematic diagram illustrating a general network deployment supporting CMP announcement. In particular, in the network deployment in FIG. 6, an end entity and a CA are connected.

RFC4210 itself does not specify in detail how the CAKeyUpdAnnContent is communicated to the EEs on initiative of the CA side. To communicate the Announcement from the CA to the EE, the mechanisms as detailed in RFC6712, section 3.7, may be used. This is done by pushing them from the CA to the EE. For this the EE needs to run a network service listening for incoming network connections as depicted in FIG. 6.

Comments on the Existing Method a) EE automatically gets notified when new TA is available.
b) All End Entities get the new TA almost at the same time.
c) No manual intervention.
d) CA needs to maintain a list of all EEs which is difficult especially in mobile networks, as EE Internet Protocol addresses may change dynamically.
e) 3GPP does not require End Entities to support this message.
f) There is no wide support by available CMP server or client implementations for CMP Announcements (yet).
g) The EEs would need to provide a network service for receiving such announcement messages, which adds to their attack surface and requires to define new firewall rules to allow for such a traffic.
h) The "CA Key Update Announcement Content" does require mutual cross-certification of the two PKI hierarchies having the old and the new TA on their top. This might not be desired.
i) This might result in network load issues with the CMP server trying to notify all EEs when new TA is available.

Existing Method C: EE Polling for TA Update Information by Means of a CMP General Message As per appendix E.5 of RFC4210, an EE can send a CMP general message (genm) to the CMP server requesting details that will be required for later PKI management operations. CA responds with a general response which may contain information (in form of a CAKeyUpdAnnContent structure) about TA update if available. This procedure is currently only specified for TA update, but could also be extended for prematurely updating EE and intermediate CA certificates.

FIG. 7 depicts how an EE polls information from the CA using a CMP general message. FIG. 7 is a schematic diagram illustrating a general network deployment supporting EE polling. In particular, in the network deployment in FIG. 7, an end entity and a CA are connected and exchange general messages as mentioned above.

Comments on the Existing Method a) No manual intervention needed.
b) The procedure might result in network load issues with many EEs doing periodic polling.
c) The procedure might result in load issues on the CA with many EEs doing periodic polling.
d) No implementation (yet)
e) The "CA Key Update Announcement Content" requires mutual cross-certification of the two PKI hierarchies having the old and the new TA on their top. This might not be desired.

Reference:
PATL1: PCT/EP2014/067920, filed Aug. 22, 2014

SUMMARY OF THE INVENTION

According to a first aspect of the invention, there is provided an apparatus, comprising checking means adapted to check if an indication is received that a certificate installed in a communication entity is to be revoked at a revocation time in the future; first preparing means adapted to prepare, if the indication is received, a first revocation list, wherein the first revocation list comprises an identifier of the certificate and the revocation time; first providing means adapted to provide the first revocation list to the communication entity.

The certificate may be a first end entity certificate signed by private key corresponding to an old trust anchor certificate, and the apparatus may further comprise responding means adapted to respond to a key update request of the certificate by providing a second end entity certificate signed by a private key corresponding to a new trust anchor certificate and the new trust anchor certificate.

The apparatus may further comprise determining means adapted to determine that all end entities having an end entity certificate signed by a private key corresponding to the old trust anchor certificate have installed a respective second end entity certificate, wherein each of the second end entity certificates is signed by a private key corresponding to the new trust anchor certificate; second preparing means adapted to prepare, if it is determined that all the end entities have installed the respective second end entity certificates, a second revocation list, wherein the second revocation list comprises an identifier of the second end entity certificates and the revocation time; and second providing means adapted to provide the second revocation list to the communication entity.

The first preparing means may be adapted to include the identifier and the revocation time in an extension field of the first revocation list.

The first preparing means may be adapted to include the identifier and the revocation time as an entry into a list of one or more revoked certificates of the first revocation list.

The apparatus may further comprise setting means adapted to set at least one of a reason code of the entry and an extension field of the entry such that it indicates that the revocation time is in the future.

According to a second aspect of the invention, there is provided an apparatus, comprising checking means adapted to check if an indication is received that a first certificate is going to be revoked at a revocation time in the future, wherein the revocation time is received in a revocation list comprising an identifier of the first certificate, and wherein the revocation time is assigned to the identifier; first requesting means adapted to request, if the indication is received, an update of the first certificate.

The identifier and the revocation time may be included in an extension field of the revocation list.

The identifier and the revocation time may be included as an entry in a list of one or more revoked certificates.

The checking means may be adapted to check whether at least one of a reason code of the entry and an extension field of the entry indicates that the revocation time is in the future.

The apparatus may further comprise comparing means adapted to compare an actual time and the revocation time; and the checking means may be adapted to consider that the indication is received if the revocation time is later than the actual time.

The apparatus may further comprise migrating means adapted to migrate, if the indication is received, from the first certificate to a second certificate such that the second certificate is installed latest at the revocation time.

The migrating means may be adapted to install an interim certificate at an installation time earlier than the revocation time such that the first certificate and the interim certificate are simultaneously valid between the installation time and the revocation time, and to install the second certificate after the interim certificate was installed and latest at the revocation time.

The apparatus may further comprise second requesting means adapted to request an update of the interim certificate at a time at or before the revocation time.

According to a third aspect of the invention, there is provided an apparatus, comprising checking circuitry configured to check if an indication is received that a certificate installed in a communication entity is to be revoked at a revocation time in the future; first preparing circuitry configured to prepare, if the indication is received, a first revocation list, wherein the first revocation list comprises an identifier of the certificate and the revocation time; first providing circuitry configured to provide the first revocation list to the communication entity.

The certificate may be a first end entity certificate signed by private key corresponding to an old trust anchor certificate, and the apparatus may further comprise responding circuitry configured to respond to a key update request of the certificate by providing a second end entity certificate signed by a private key corresponding to a new trust anchor certificate and the new trust anchor certificate.

The apparatus may further comprise determining circuitry configured to determine that all end entities having an end entity certificate signed by a private key corresponding to the old trust anchor certificate have installed a respective second end entity certificate, wherein each of the second end entity certificates is signed by a private key corresponding to the new trust anchor certificate; second preparing circuitry configured to prepare, if it is determined that all the end entities have installed the respective second end entity certificates, a second revocation list, wherein the second revocation list comprises an identifier of the second end entity certificates and the revocation time; and second providing circuitry configured to provide the second revocation list to the communication entity.

The first preparing circuitry may be configured to include the identifier and the revocation time in an extension field of the first revocation list.

The first preparing circuitry may be configured to include the identifier and the revocation time as an entry into a list of one or more revoked certificates of the first revocation list.

The apparatus may further comprise setting circuitry configured to set at least one of a reason code of the entry and an extension field of the entry such that it indicates that the revocation time is in the future.

According to a fourth aspect of the invention, there is provided an apparatus, comprising checking circuitry configured to check if an indication is received that a first certificate is going to be revoked at a revocation time in the future, wherein the revocation time is received in a revocation list comprising an identifier of the first certificate, and wherein the revocation time is assigned to the identifier; first requesting circuitry configured to request, if the indication is received, an update of the first certificate.

The identifier and the revocation time may be included in an extension field of the revocation list.

The identifier and the revocation time may be included as an entry in a list of one or more revoked certificates.

The checking circuitry may be configured to check whether at least one of a reason code of the entry and an extension field of the entry indicates that the revocation time is in the future.

The apparatus may further comprise comparing circuitry configured to compare an actual time and the revocation time; and the checking circuitry may be configured to consider that the indication is received if the revocation time is later than the actual time.

The apparatus may further comprise migrating circuitry configured to migrate, if the indication is received, from the first certificate to a second certificate such that the second certificate is installed latest at the revocation time.

The migrating circuitry may be configured to install an interim certificate at an installation time earlier than the revocation time such that the first certificate and the interim certificate are simultaneously valid between the installation time and the revocation time, and to install the second certificate after the interim certificate was installed and latest at the revocation time.

The apparatus may further comprise second requesting circuitry configured to request an update of the interim certificate at a time at or before the revocation time.

According to a fifth aspect of the invention, there is provided a method, comprising checking if an indication is received that a certificate installed in a communication entity is to be revoked at a revocation time in the future; preparing, if the indication is received, a first revocation list, wherein the first revocation list comprises an identifier of the certificate and the revocation time; providing the first revocation list to the communication entity.

The certificate may be a first end entity certificate signed by private key corresponding to an old trust anchor certificate, and the method may further comprise responding to a key update request of the certificate by providing a second end entity certificate signed by a private key corresponding to a new trust anchor certificate and the new trust anchor certificate.

The method may further comprise determining that all end entities having an end entity certificate signed by a private key corresponding to the old trust anchor certificate have installed a respective second end entity certificate, wherein each of the second end entity certificates is signed by a private key corresponding to the new trust anchor certificate; preparing, if it is determined that all the end entities have installed the respective second end entity certificates, a second revocation list, wherein the second revocation list comprises an identifier of the second end entity certificates and the revocation time; and providing the second revocation list to the communication entity.

The preparing of the first revocation list may comprise including the identifier and the revocation time in an extension field of the first revocation list.

The preparing of the first revocation list may comprise including the identifier and the revocation time as an entry into a list of one or more revoked certificates of the first revocation list.

The method may further comprise setting at least one of a reason code of the entry and an extension field of the entry such that it indicates that the revocation time is in the future.

According to a sixth aspect of the invention, there is provided a method, comprising checking if an indication is received that a first certificate is going to be revoked at a revocation time in the future, wherein the revocation time is received in a revocation list comprising an identifier of the first certificate, and wherein the revocation time is assigned to the identifier; requesting, if the indication is received, an update of the first certificate.

The identifier and the revocation time may be included in an extension field of the revocation list.

The identifier and the revocation time may be included as an entry in a list of one or more revoked certificates.

The checking if the indication is received comprises checking whether at least one of a reason code of the entry and an extension field of the entry indicates that the revocation time is in the future.

The method may further comprise comparing an actual time and the revocation time; and the checking if the indication is received may comprise considering that the indication is received if the revocation time is later than the actual time.

The method may further comprise migrating, if the indication is received, from the first certificate to a second certificate such that the second certificate is installed latest at the revocation time.

The migrating may comprise installing an interim certificate at an installation time earlier than the revocation time such that the first certificate and the interim certificate are simultaneously valid between the installation time and the revocation time, and installing the second certificate after the interim certificate was installed and latest at the revocation time.

The method may further comprise requesting an update of the interim certificate at a time at or before the revocation time.

Each of the methods of the fifth and sixth aspects may be a method of future certificate revocation.

According to a seventh aspect of the invention, there is provided a computer program product comprising a set of instructions which, when executed on an apparatus, is configured to cause the apparatus to carry out the method according to any of the fifth and sixth aspects. The computer program product may be embodied as a computer-readable medium or directly loadable into a computer.

According to some example embodiments of the invention, at least the following advantages are provided:

Seamless update and migration of certificates from within the PKI;
Manual effort is reduced:
  No manual trigger per EE is required, update may be completely automatic after the trigger in the CRL is set;
  No manual monitoring of certificate update process is required;
Administrative effort is reduced;
Security is enhanced:
  Use of O&M interfaces for certificates is avoided;
The solution may be backwards compatible;
The solution may or may not be standardized;
Computational effort at EE may be minimized.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of example embodiments of the present invention which is to be taken in conjunction with the appended drawings, wherein FIG. 1 explains some principles of a PKI hierarchy.

DETAILED DESCRIPTION OF CERTAIN EXAMPLE EMBODIMENTS

Figure 1:
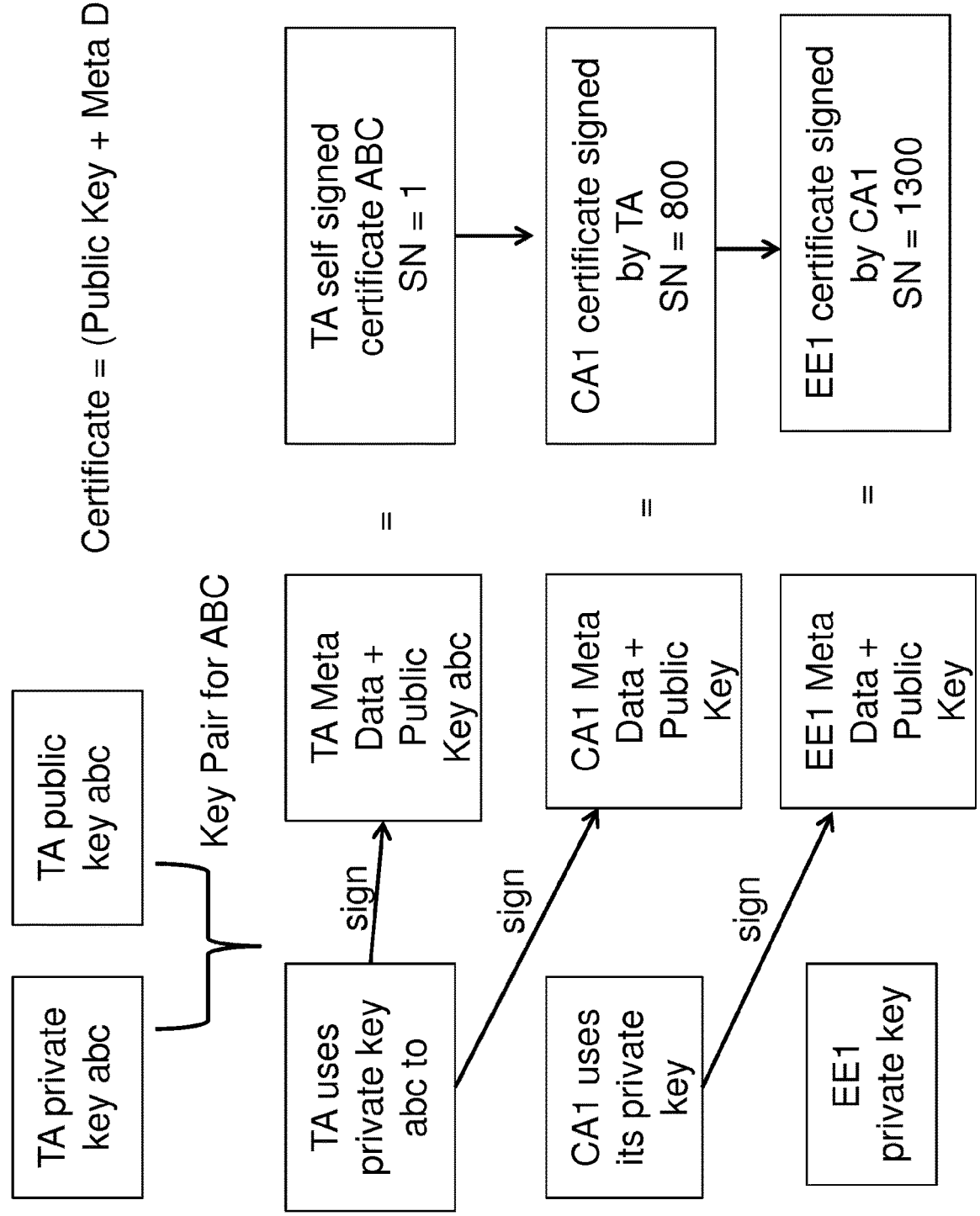
Figure 2:
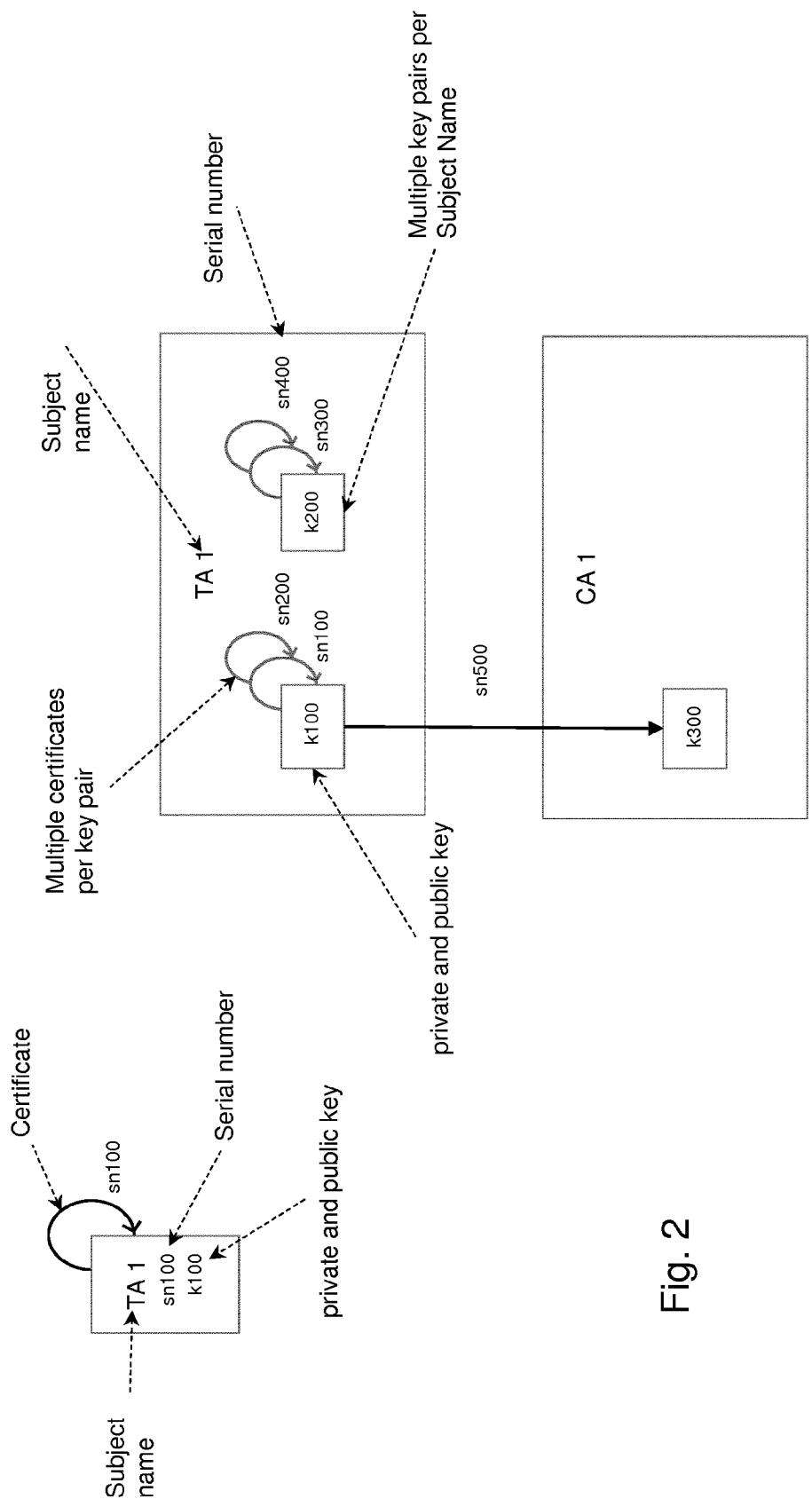
FIG. 2 shows a legend explaining the notations used in the figures.
Figure 3:
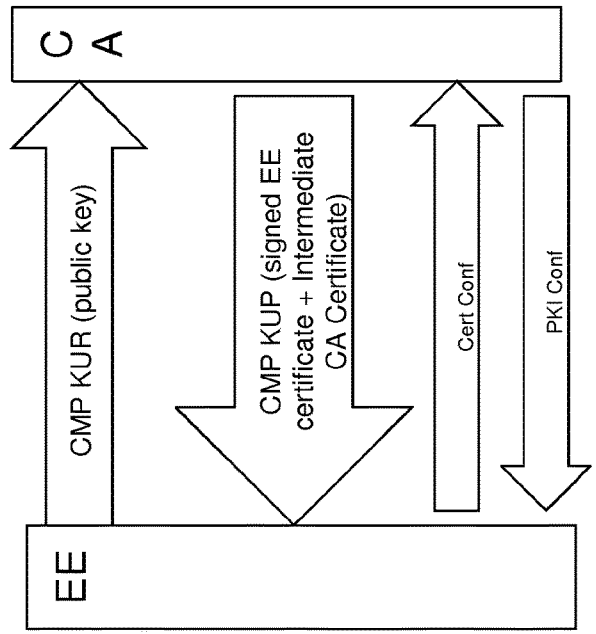
FIG. 3 explains CMP Initial Request, Key Update Request and an enhanced Key update request procedure.
Figure 3:
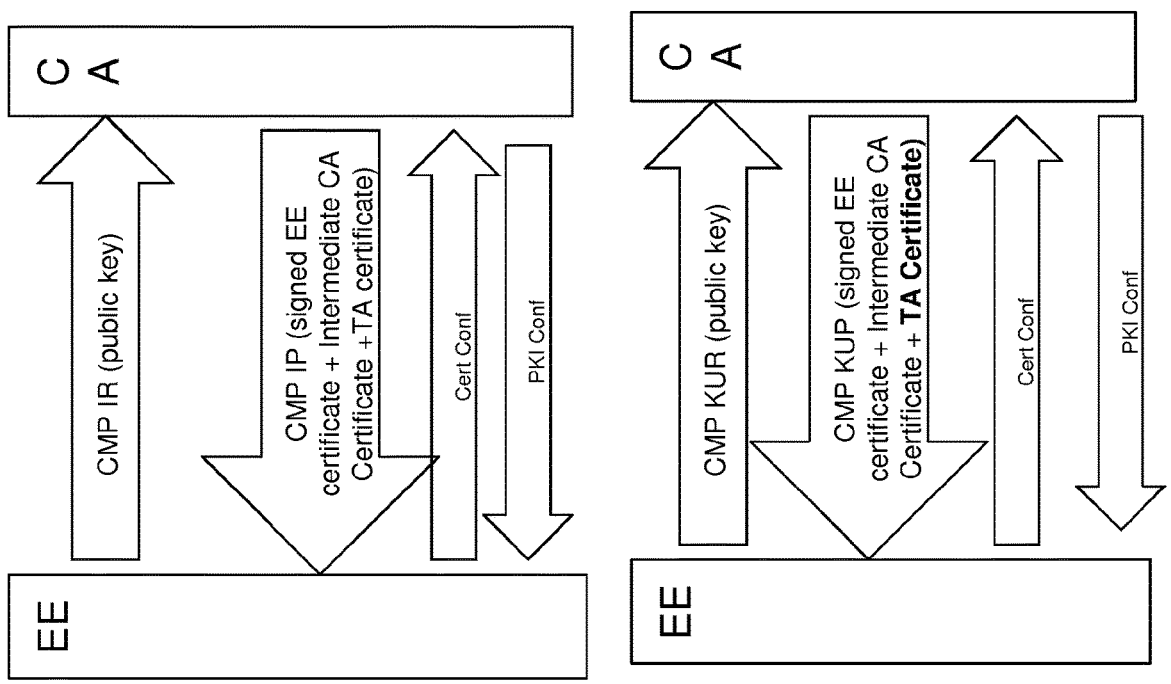

Herein below, certain example embodiments of the present invention are described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments of the invention address the problem of unscheduled certificate updates in Network Elements having mutual trust by means of a PKI. According to these example embodiments, unscheduled certificate updates are triggered through means native to PKI by using CRLs. Therein, different options for updating EE, intermediate CA certificate and TA certificates are presented.

Some example embodiments of the invention solve the problem how to communicate the need to execute unscheduled updates of certificate to the EE by using native PKI means. They may be applied to each of the following certificate types but can be also to any other conceivable certificate type:

1. End Entity (EE) certificates
2. Intermediate Certificate Authority (CA) certificates (also called subordinate CA or "Sub CA")
3. Trust Anchor (TA) certificates (also called "Root CA")

According to some example embodiments of the invention, an automated procedure to achieve unscheduled early Trust Anchor migration and the early unscheduled migration of other certificates in PKIs utilizing CMP messages and an existing Certificate Revocation List (CRL) distribution framework is executed.

CA may issue a CRL regularly (e.g. periodically), or at certain occasions (e.g. if a certificate is revoked). In addition, an EE may request the CRL from CA.

According to some aspects of the invention, a CRL is used to trigger a TA migration procedure, and/or the early renewal of any other certificate within the certification path of an EE's certificate, including the EE's certificate itself. "Early" renewal means that the migration is performed for other reasons than expiry of the certificate. If the early migration is scheduled at a time later than the expiry time of the certificate, the latter may have prevalence. I.e., in this case, the certificate is migrated at its expiry time (in general, at the earlier time of the expiry time and the early migration time).

Reasons for early migration may be e.g.

1. Change of cryptographic keys
2. Change in certificate parameters
3. Merger/Acquisitions of two companies that require split/merge of the security domains CRLs are a native part of the PKI landscape and are intensively used. Generally a CRL contains information of already revoked certificates issued by a particular CA or by TA. EEs do not provide a CRL because they do not issue certificates to other entities.

According to some example embodiments of the invention, a CRL is used to contain information regarding future revocation of certificates in order to trigger early Trust Anchor migration or certificate update.

As per RFC 5280, chapter 5, a CRL contains the high-level fields shown in Table 1:

TABLE 1

High-level fields of CRL according to RFC 5280

```
CertificateList ::= SEQUENCE {
    tbsCertList        TBSCertList,
    signatureAlgorithm AlgorithmIdentifier,
    signatureValue     BIT STRING }
TBSCertList ::= SEQUENCE {
    version            Version OPTIONAL,
                       -- if present, MUST be v2
    signature          AlgorithmIdentifier,
    issuer             Name,
    thisUpdate         Time,
    nextUpdate         Time OPTIONAL,
    revokedCertificates SEQUENCE OF SEQUENCE {
        userCertificate    CertificateSerialNumber,
        revocation Date    Time,
        crlEntryExtensions Extensions OPTIONAL
                           -- if present, version MUST be v2
    }  OPTIONAL,
    crlExtensions      [0] EXPLICIT Extensions OPTIONAL
                       -- if present, version MUST be v2
}
```

In Table 1, the list of revoked certificates is present in the field revokedCertificates. The field contains, for each revoked certificate, its serial number, revocation date and optionally the crlEntryExtensions.

According to some example embodiments of the invention, one of the following fields may be used by CA to indicate that a certificate is to be revoked early and at what time it is revoked:

i. Section 5.2 of RFC 5280 allows the definition of crlExtensions for new use cases. Hence, according to some example embodiments of the invention, a crlExtension dedicated to convey information about future revocation is created. Its content may be very similar to the revokedCertificates field. I.e., it may comprise, for each certificate to be revoked early, its serial number (or another identifier) and its future revocation time.

EEs according to these example embodiments of the invention are enabled to understand this field and extract the information from there which certificate with which serial number will be revoked at what time and CA will invalidate the certificate at that time.

Here, the risk that EEs not supporting this feature might get confused is very low as they will usually ignore unknown crlExtensions not marked as critical. That is, at least if there is a risk that some involved EEs do not support this feature, the corresponding crlExtensions should not be marked as critical.

ii. The revokedCertificates field of the CRL may be used to convey a future revocation of a certificate, i.e. a reference to a certificate is added in the revocation list, but the date of revocation is in the future. The End Entity according to such example embodiments of the invention uses this information as a trigger to start the PKI migration.

a.) That is, in some of these example embodiments, EE compares the actual time and the time indicated in the revocationDate field. If the time indicated in the revocationDate field is later than the actual time, EE understands that an early migration is indicated and will start the migration accordingly. In these example embodiments, neither a dedicated reason code nor crlEntryExtensions are used to convey explicitly the information that the revocation date is in the future.

b.) In some of these example embodiments a dedicated reason code may be used. This reason code indicates that the revocation will take place in the future. Thus, the EE does not need to compare the time of the revocationDate field and the actual time in order to trigger an early migration. A reservation of such code by the relevant standards organization (IETF) is preferred.

c.) Section 5.3 of RFC 5280, allows the definition of crlEntryExtensions for new use cases. Thus, according to some of these example embodiments, crlEntryExtensions is used to create a similar but technically different indicator than the "reason code" extension as discussed in the paragraph above. According to these example embodiments, a dedicated CRL entry extension is used that contains an unambiguous information that the revocation will take place in the future. This might effectively duplicate the functionality of the "reason code" extension according to b.) to be exclusively understood by the EEs enabled for this feature.

d.) A new field may be defined in revokedCertificates in order to explicitly convey the information that the revocation date is in the future.

Note that there is (may be) a revocationDate field, reason code, and crlEntryExtensions for each certificate listed in the CRL. In particular, according to some example embodiments of the invention, two or three of options b.) to d.) may be used together. Options b.) to d.) have an advantage that the computational effort at the EE is much less than according to option a.).

For rollout scenarios, it needs to be taken into account that EEs not supporting indication of an early migration by the revocationDate field (with or without a dedicated reason code, and/or with or without dedicated use of crlEntryExtensions, and/or with or without use of the new field in revokedCertificates) might consider any certificate listed in the CRL as revoked even if its revocationDate lies in the future, ignoring the indicated revocation time and/or the "reason code" completely.

According to some example embodiments of the invention, a certificate is not only early revoked but replaced by another one ("migrated", "updated").

According to some example embodiments of the invention, different options are available to trigger certificate updates. That is, the CRL to be used to convey the future revocation date may be selected depending on which level's certificate is to be revoked.

I. Future Revocation of EE Certificate is Communicated to Trigger Certificate Update In this case, the EE certificate's SN is put into the CRL according to any of the above described example embodiments of the invention. The relevant CRL is issued by CA or TA depending on which of these entities had signed the EE cert. In this way, early revocation of TA cert/intermediate CA cert/and EE cert may be executed. This also allows for optional update of intermediate CA certificates and TA certificates.

Comments Regarding this Option a) Allows for only triggering the update for specific EEs.
b) Can also be used to update the intermediate CA certificates and TA certificate in the certificate chain
c) In a large PKI network the CRL might become really huge when all (or many) EEs are to be updated (in case of updating CA certificate or TA certificate).

II. Future Revocation of Intermediate CA Certificate is Communicated to Trigger Certificate Update In this case, the intermediate CA certificate's SN is put into the CRL according to any of the above described example embodiments of the invention. The relevant CRL is issued by CA or TA depending on which of these entities had signed the intermediate CA cert. In this way, early revocation of TA cert/intermediate CA cert may be executed.

In general, when higher level certificates change, EE certificates will change, too, if no alternative certificate chain is available. However, it is not imperative that the EE certificates are updated, e.g. when the newly issued intermediate CA certificate is suitable to validate the existing EE certificates' chains to an existing trust anchor.

Comments Regarding this Option a) Few entries in CRL, even when all EEs under a specific intermediate CA are to be updated.
b) The PKI hierarchy must have at least 1 layer of intermediate CAs.

III. Future Revocation of TA Certificate is Communicated to Trigger Certificate Updates In this case, the TA certificate's SN is put into the CRL according to any of the above described example embodiments of the invention. The relevant CRL is issued by TA itself. In this way, early revocation of TA cert may be executed only.

Generally, the intermediate CA and EE certificates issued by the TA to be revoked in the future become invalid too, (if no alternative certificate chain is available).

Comments Regarding this Option a) Direct trigger to communicate need for TA update
b) Smallest possible number of entries in the CRL if intention for the trigger is that the TA needs to be replaced.
c) The EEs need to be configured to react appropriately on the nearby date for the TA to become by adding a delay into their update cycle to avoid them going into an update loop.
Namely, if the same TA is deployed after TA update, the EE will go into an update loop. In order to avoid this problem, one of the following countermeasure may be used:
configure EEs to react appropriately by adding a delay into their update cycle;
during TA update, new TA shall be provided with different serial number but same pair of private and public keys.

In some example embodiments of the invention, an early update processes with explicit trigger may look as follows:

Use Cases

I. Using CRL Based Trigger to Update TA

The following description illustrates a method according to some example embodiments of the invention for unscheduled Trust Anchor migration using the future revocation information as trigger. Note that the overall process of doing a prescheduled Trust Anchor migration is already described in PATL1. The difference to the former application is that, according to some example embodiments of the present invention, the migration is unscheduled (=not scheduled due to the expiry date of the certificate) but explicitly triggered.

Figure 4:
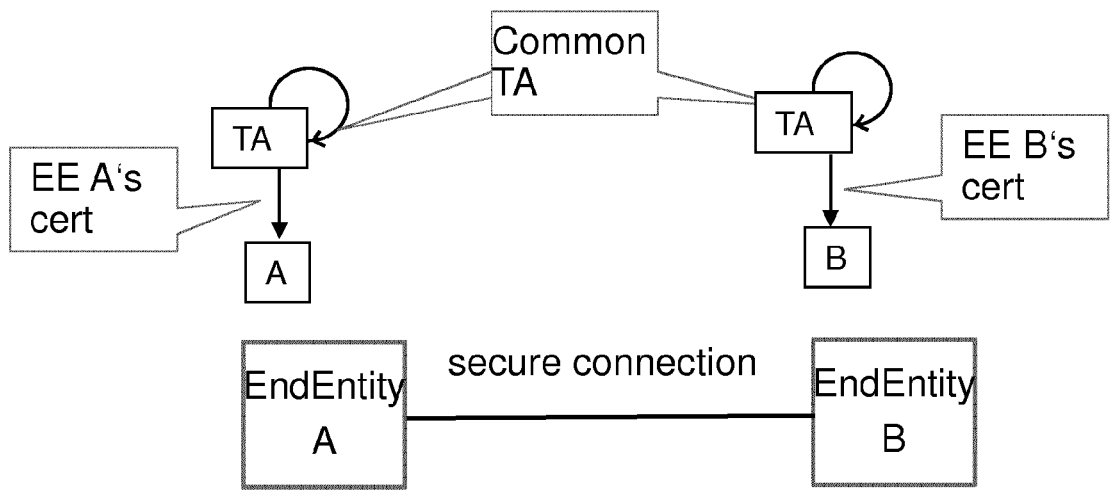
FIG. 4 is a schematic diagram illustrating a general network deployment in which a secure connection is established between end entities.

It is assumed a configuration corresponding to that of FIG. 4 with EE A and EE B and a common TA. When EE A receives information via the CRL that its own certificate will be revoked soon, it will go on with the update procedure for TA, intermediate CA certificate, and own certificate as determined by the configured triggering algorithms (in this example the future revocation time mentioned in the CRL, in short: "t-crlkur"). The difference to the originally existing schedule is that the future revocation time as communicated by means of the CRL is taken for the calculations instead of the validity time stated in the certificate.

Figures 8, 9:
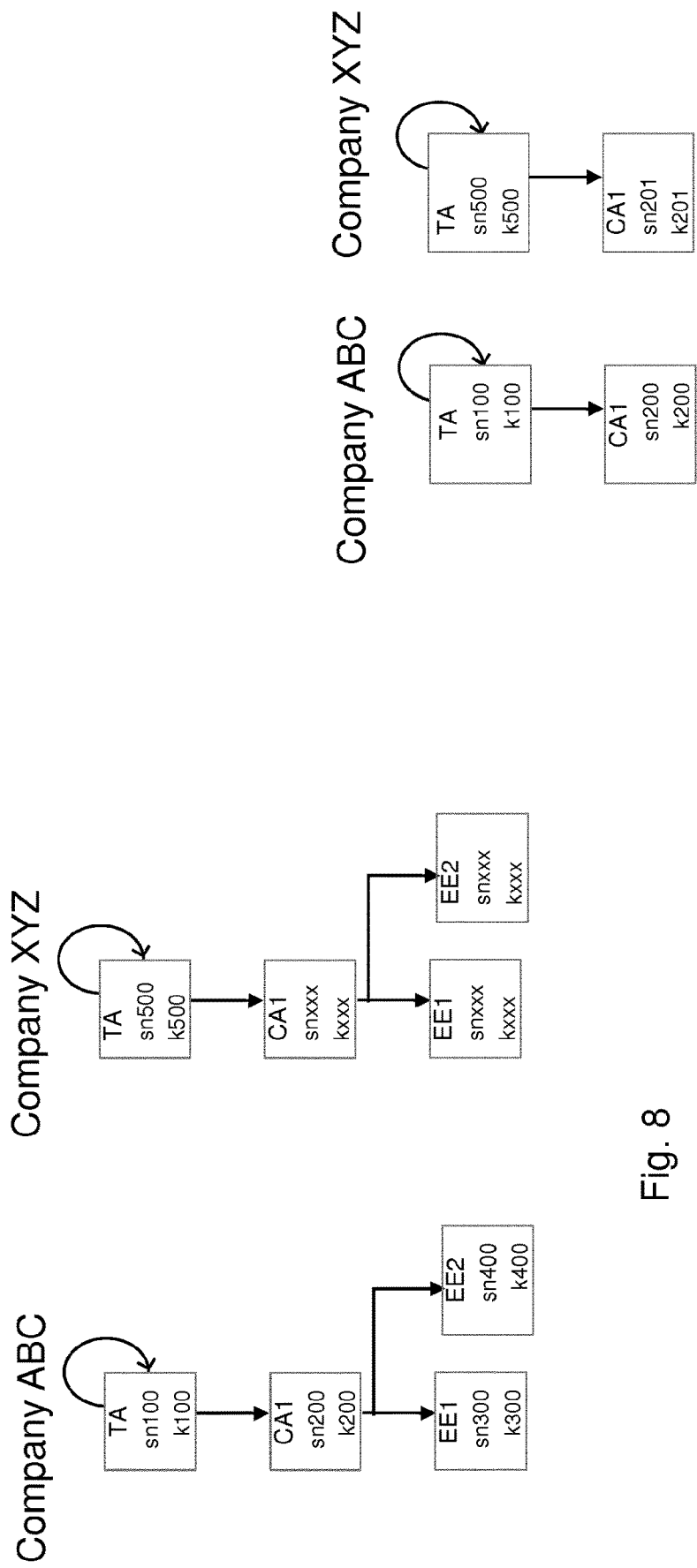
FIGS. 8, 9, and 10 show a migration process according to an example embodiment of the invention.
Figure 10:
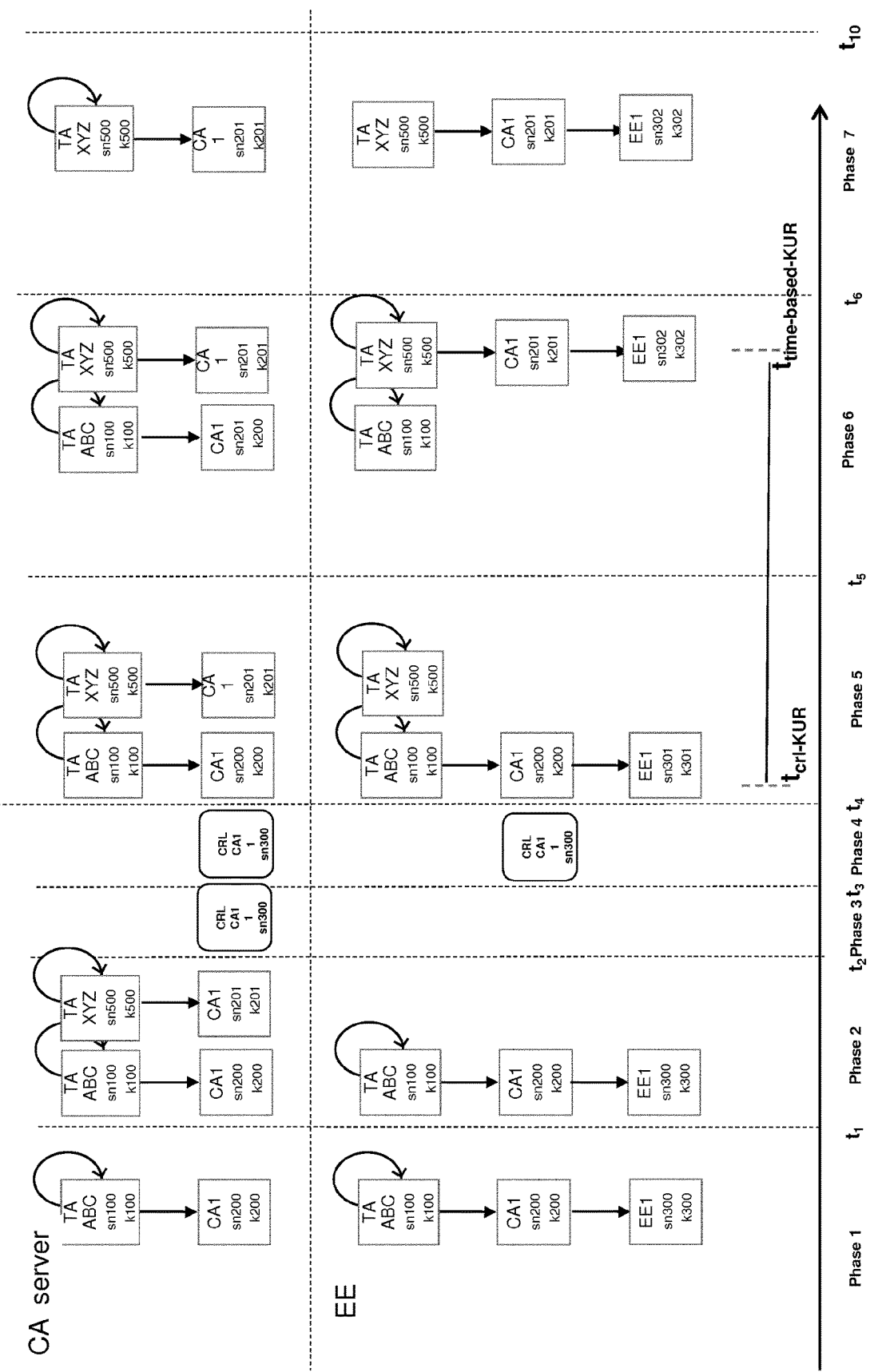

An example process of trust anchor update using the CRL based trigger is described in detail based on FIGS. 8 to 10.

FIG. 8 shows a current situation (left part) and a target situation (right part). E.g., a company ABC runs a PKI with a single intermediate CA named CA1 and two EEs EE1 and EE2. The respective certificates and key pairs are sn100, k100; sn200, k200; sn300, k300; and sn400, k400, as indicated in the left part of FIG. 8.

The right part of FIG. 8 shows a target situation. Company ABC decided to rebrand to XYZ. They will also rebrand their TA. Hence, they have to rename the subject-name and optionally create a new key pair (e.g. k500) and a new self-signed certificate (e.g. sn500). The subject names of CA1 and EE1, EE2 remain.

As shown in FIG. 9, as next steps on CA Server, XYZ keypair (k500) and XYZ TA certificate (sn500) are created. Then, a new keypair is created (k201) for CA1 and signed by XYZ TA. Optionally, cross certificates may be created.

At that stage, the EEs (EE1 and EE2) are not modified. There are several options to indicate to the EEs that they have to perform a CMP key update:
A. TA certificate ABC (sn100) may be revoked;
B. CA certificate (sn200) may be revoked; and
C. EE1 and EE2 certificates (sn300 and sn400) may be revoked.

Hereinafter, by means of FIG. 10, option C is described in detail. However, options A and B may be executed correspondingly.

FIG. 10 shows the status of certificates and key pairs at CA Server (top part) and EE (bottom part) over time. EE may be any one of EE1 and EE2 of FIGS. 8 and 9. Time is divided into phases 1 to 7 separated at corresponding times $t_1$ to $t_6$. The time scale is not to scale but for illustrative purposes only.

In phase 1, the original situation as shown in FIG. 8 (left part) is shown again.

Phase 2 corresponds to FIG. 9, new TA XYZ, and his subordinate CA1 with serial number 201 are created and installed on CA Server.

In phase 3, CA1 issues a CRL (CRL's serial number is 1 in this example) indicating the future revocation of EE certificate with sn300. The CRL may be signed by k200. The CRL indicating the future revocation may have a format as discussed hereinabove. The CRL is downloaded to EE in phase 4. Thus, EE is informed about the future revocation.

Figure 5:
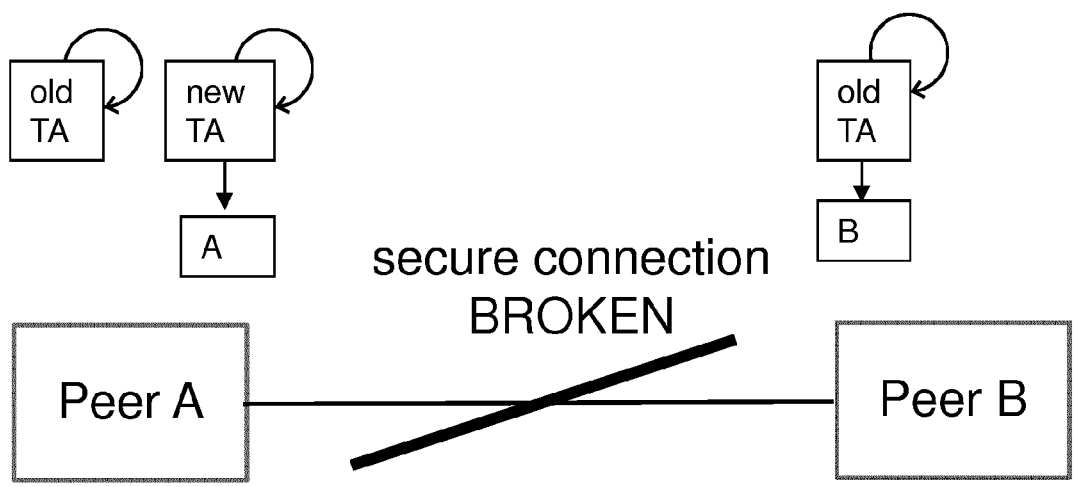
FIG. 5 is a schematic diagram illustrating a general network deployment in which a secure connection between end entities is broken.
Figure 6:
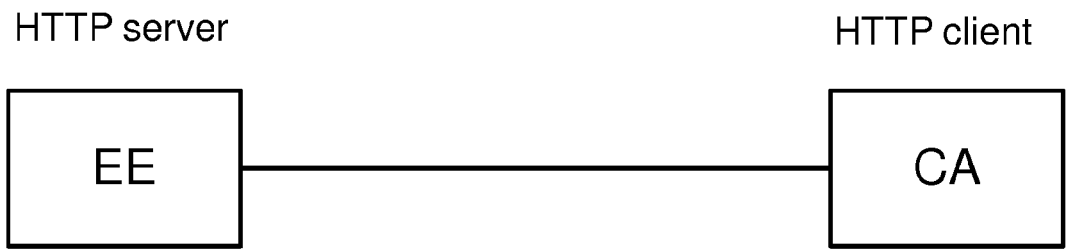
FIG. 6 is a schematic diagram illustrating a general network deployment supporting certificate management protocol announcement.
Figure 7:
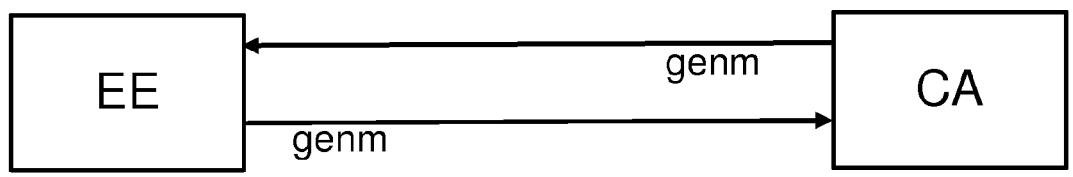
FIG. 7 is a schematic diagram illustrating a general network deployment supporting end entity polling.

In phase 5, based on CRL, EE triggers a key update request. The KUR may be signed by k300. In response to this KUR message, intermediate CA CA1 (sn200) issues a new certificate to EE with serial number 301. As part of this response, EE also gets the new TA XYZ (The enhancement of KUP message to deliver TA is described in PATL1). The certificate lifetime of EE1 is selected such that sn301 expires before the planned migration deadline (at $t_{crl2\_KUR}$). Hence, this certificate (EE1, sn301) may be named interim certificate. In order to avoid a connection loss as shown in FIG. 5, all EEs must have XYZ TA before phase 6 is started. In other words: All EEs should have received the new TA XYZ latest by t5. The crl-KUR may take place at any time between receipt of CRL and the indicated revocation time. In order to avoid high network load, e.g., the time of crl-KUR may be determined by a random function. In some example embodiments, a delay time after receipt of the CRL may be preconfigured. The delay time may be different for different EEs. Instead of determining the time of crl-KUR based on the receipt of the CRL, the time may be determined based on the revocation time.

In phase 6, before expiry of sn301, EE issues another KUR to CA Server and receives the chain from XYZ TA. At the revocation time indicated in the CRL, TA ABC and its dependent keys and certificates are optionally deleted from EE (phase 7). The process is finished at $t_{10}$.

Figure 11:
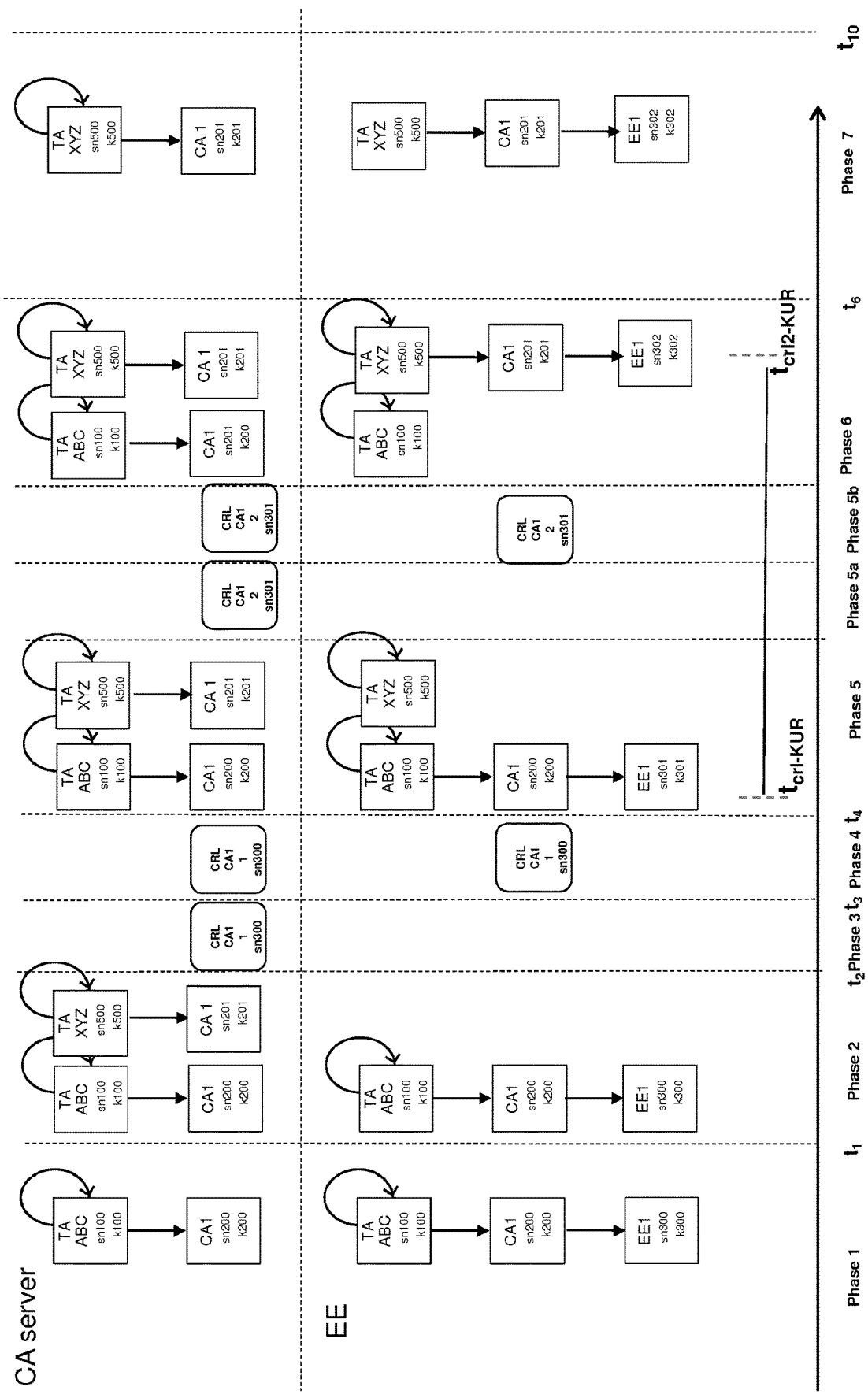
FIG. 11 shows a migration process according to an example embodiment of the invention.

FIG. 11 shows an alternative example embodiment of the invention. FIG. 11 corresponds to FIG. 10 and the process shown corresponds to that of FIG. 10 up to phase 5. However, while the second KUR according to FIG. 10 is scheduled by time (i.e. by the expiry date of sn301), according to FIG. 11 a corresponding second KUR is initiated by another CRL issued by CA (phase 5a) and forwarded to EE (phase 5b). This CRL is signed by CA1 (k200) and has serial number 2 and indicates that sn301 will be revoked in the future. Any of the above described options for the CRL may be used.

There are various options which can trigger the issuance of the second CRL by CA. E.g., EEs typically inquire regularly (e.g. once a day) their CA whether a new CRL is available. Hence, if the time between issuance of the first CRL and the first KUR is appropriately configured, some time after issuance of the first CRL (or some time before the revocation date), CA may reasonably assume that all EES are in phase 5. As an alternative, CA may check if new certificates corresponding to sn301 were issued for all EEs. According to this example embodiment, CA will then issue the second CRL.

Correspondingly to the behaviour described for phases 3 to 5, EE will then, in phase 6, request KUR and receive the new chain with TA XYZ, CA with sn201 and EE sn302. Phase 7 of FIG. 11 corresponds to that of FIG. 10.

II. Using CRL Based Trigger to Update EE and Intermediate CA Certificate

According to some example embodiments of the invention, the same concept as for updating TA is applied correspondingly to update EE and/or intermediate CA certificate. As the TA is not getting updated, just the normal process for EE and Intermediate CA certificate update is followed. The future revocation information of EE or Intermediate CA certificate as communicated in the CRL is used instead of the validity time stated in the certificate. Upon receiving the CRL with the relevant information the EE can trigger a KUR (Key Update Request) and the CMP server can send the updated (or possibly even same) EE certificate and its updated (or same) chain with intermediate CA certificates in response.

Figure 12:
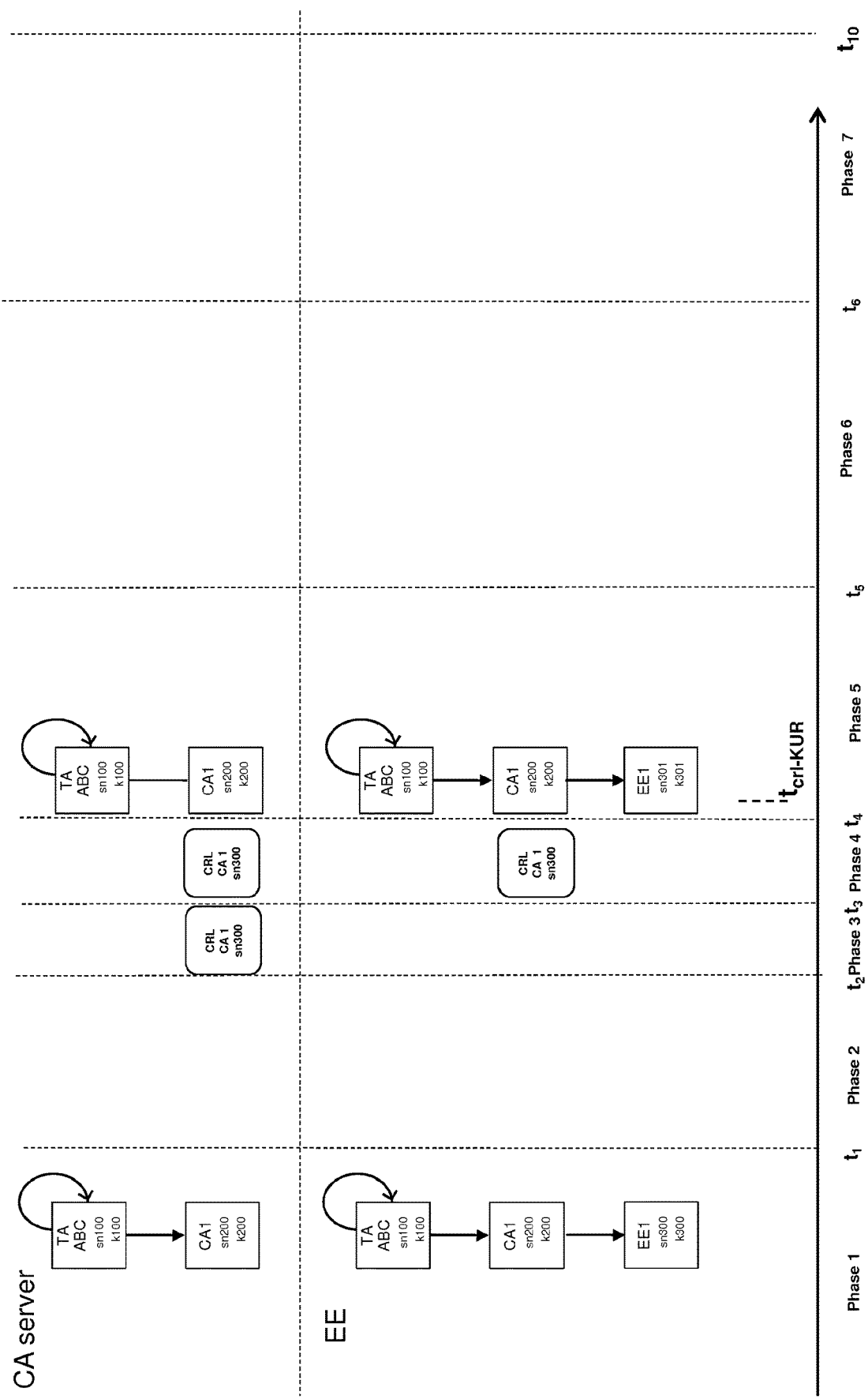
FIG. 12 shows a migration process according to an example embodiment of the invention.

FIG. 12 shows a method according to an example embodiment of the invention, wherein an EE certificate is updated. The notations correspond to those of FIGS. 10 and 11. The initial configuration shown in phase 1 is the same as according to FIGS. 10 and 11. In phase 2, the key hierarchy etc. is not modified. In phase 3, CA1 issues a CRL that EE cert sn300 is to be revoked. Any of the options outlined above may be used for the format of the CRL. The CRL is transmitted to EE in phase 4. In phase 5, EE sends KUR for sn300 and receives, in response by KUP, the new certificate sn301 for the new key pair k301. Then, the process is finished.

Figure 13:
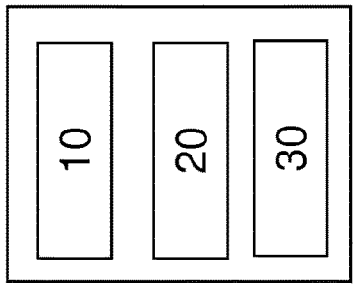
FIG. 13 shows an apparatus according to an example embodiment of the invention.

FIG. 13 shows an apparatus according to an example embodiment of the invention. The apparatus may be TA or CA, or an element thereof.

Figure 14:
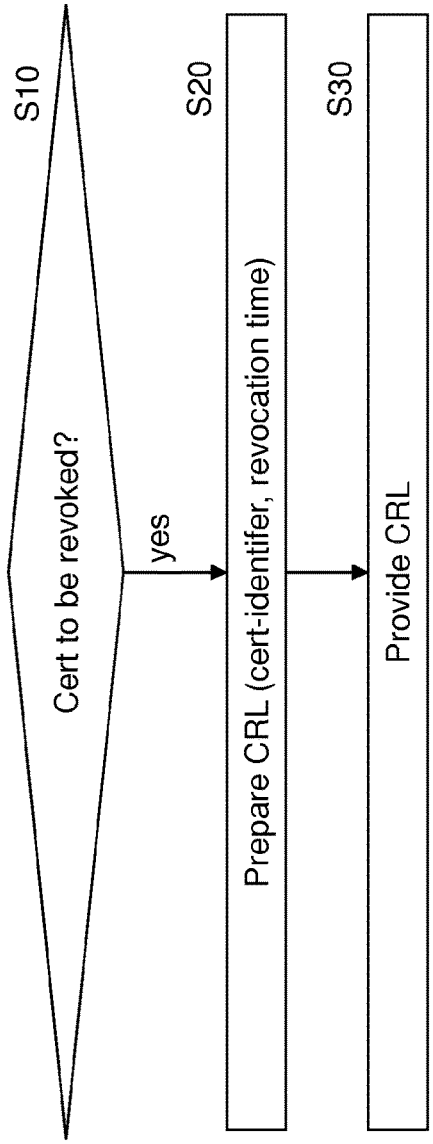
FIG. 14 shows a method according to an example embodiment of the invention.

FIG. 14 shows a method according to an example embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises checking means 10, preparing means 20, and providing means 30.

The checking means 10 checks if an indication is received that a certificate installed in a communication entity is to be revoked at a revocation time in the future (S10). E.g., such an indication may be input by a user, or it may be provided by another entity such as a CMP server or O&M.

If the indication is received (S10="yes"), the preparing means 20 prepares a revocation list such as a CRL, wherein the revocation list comprises an identifier of the certificate and the revocation time (S20). The revocation list may comprise identifiers of plural certificates, thereof identifiers of revoked certificates and one or more identifiers of certificates to be revoked.

The providing means (30) provides the revocation list to the communication entity (S30). This may be made by the usual way to provide revocation lists.

Figure 16:
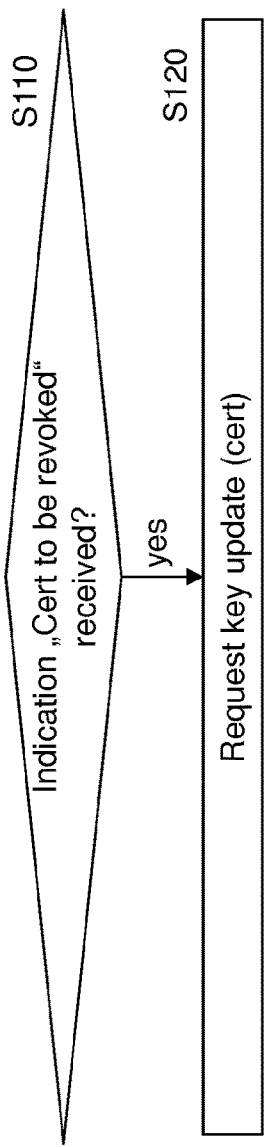
FIG. 16 shows a method according to an example embodiment of the invention.
Figure 15:
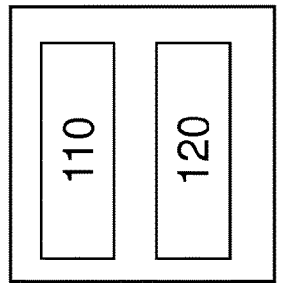
FIG. 15 shows an apparatus according to an example embodiment of the invention.

FIG. 15 shows an apparatus according to an example embodiment of the invention. The apparatus may be an EE, or an element thereof. FIG. 16 shows a method according to an example embodiment of the invention. The apparatus according to FIG. 15 may perform the method of FIG. 16 but is not limited to this method. The method of FIG. 16 may be performed by the apparatus of FIG. 15 but is not limited to being performed by this apparatus.

The apparatus comprises checking means 110, and requesting means 120.

The checking means 110 checks if an indication is received that a certificate is to be revoked at a revocation time in the future (S110). The revocation time is received in a revocation list such as a CRL. The revocation list comprises an identifier of the certificate (e.g. a serial number). In the revocation list, the revocation time is assigned to the identifier.

If the indication is received (S110="yes"), the requesting means 120 requests an update of the certificate (S120). More in detail, the requesting means may request a key update of a key comprised in the certificate.

Figure 17:
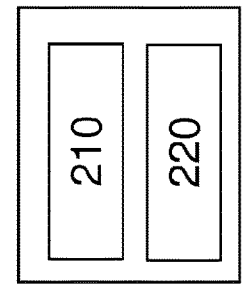
FIG. 17 shows an apparatus according to an example embodiment of the invention.

FIG. 17 shows an apparatus according to an example embodiment of the invention. The apparatus comprises at least one processor 210, at least one memory 220 including computer program code, and the at least one processor, with the at least one memory and the computer program code, being arranged to cause the apparatus to at least perform at least one of the methods according to FIGS. 14 and 16 and related description.

Example embodiments of the invention may be employed in a fixed network and/or a mobile network. For example, they may be employed in a 3GPP network such as an LTE-A network. They may be employed also in other 3GPP and non-3GPP mobile networks such as CDMA, EDGE, LTE, UTRAN, WiFi, WLAN networks, etc.

According to some example embodiments of the invention, a RA may assume the role of the CA. An RA forwards the certificates from CA to entities lower ranked in the PKI hierarchy but does not produce them. They are produced by a CA which may provide them to the RA.

A terminal may be a user equipment such as a mobile phone, a smart phone, a PDA, a laptop, a tablet PC, a wearable, a machine-to-machine device, or any other device which may be connected to the respective network such as a 3GPP network. If not otherwise indicated or made clear from the context, the terms "UE" and "user" are synonymously used in the present application.

CMP is indicated as an example of a protocol useful to administrate a PKI. However, the invention is not limited to CMP. Any other protocol suitable for the administration of a PKI, or at least to perform methods corresponding to those described herein, may be used according to example embodiments of the invention.

One piece of information may be transmitted in one or plural messages from one entity to another entity. Each of these messages may comprise further (different) pieces of information.

A time such as an expiry time and a revocation time may be indicated in any suitable format such as a date, seconds or milliseconds after some fixed point in time etc. If the time is indicated as a date, it may mean that the event (e.g. the expiration or the revocation) takes place at a fixed time of the date (e.g. at 00:00:00h or 14:07:31h) or immediately after that date (i.e. at 00:00:00h of the following day), depending on the implementation.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a certificate authority, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a communication entity such as a network element, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, means, devices, units, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered example embodiments of the present invention. However, it should be noted that the description of the embodiments is given by way of example only and that various modifications may be made without departing from the scope of the invention as defined by the appended claims.

The invention claimed is:

1. An apparatus, comprising:
at least one memory including computer program code; and
at least one processor, the at least one memory and the computer program code configured, with the at least one processor, to cause the apparatus to:
check by an entity in a communication network if an indication is received that a certificate installed in an end entity in the communication network is to be revoked at a revocation time in the future, the certificate being signed by a private key corresponding to an old trust anchor certificate;
prepare, in response to the indication being received, by the entity a first revocation list, wherein the first revocation list comprises an identifier of the certificate and the revocation time;
provide by the entity the first revocation list over the communication network to the end entity to trigger the communication entity to perform a migration of the certificate to a new certificate before the certificate installed in the communication entity is revoked based on the revocation time; and
respond by the entity to a key update request of the certificate by providing over the communication network a second end entity certificate signed by a private key corresponding to a new trust anchor certificate and the new trust anchor certificate.

2. The apparatus according to claim 1, wherein the communication entity comprises an end entity, and wherein the at least one memory and the computer program code are further configured, with the at least one processor, to cause the apparatus to:
determine by the entity that all end entities in the communication network having an end entity certificate signed by a private key corresponding to the old trust anchor certificate have installed a respective second end entity certificate, wherein each of the second end entity certificates is signed by a private key corresponding to the new trust anchor certificate;
prepare, in response to it being determined that all the end entities have installed the respective second end entity certificates, a second revocation list by the entity, wherein the second revocation list comprises an identifier of the second end entity certificates and the revocation time; and
provide by the entity the second revocation list over the communication network to the communication entity.

3. The apparatus according to claim 1, wherein:
the preparing of the first revocation list comprises including by the entity the identifier and the revocation time in an extension field of the first revocation list.

4. The apparatus according to claim 1, wherein:
the preparing of the first revocation list comprises including the identifier and the revocation time as an entry into a list of one or more revoked certificates of the first revocation list.

5. The apparatus according to claim 4, wherein the at least one memory and the computer program code are further configured, with the at least one processor, to cause the apparatus to:
set by the entity at least one of a reason code of the entry and an extension field of the entry such that the entry indicates that the revocation time is in the future.

6. A method, comprising
checking by an entity in a communication network if an indication is received that a certificate installed in an end entity in the communication network is to be revoked at a revocation time in the future, the certificate being signed by a private key corresponding to an old trust anchor certificate;
preparing, in response to the indication being received, by the entity a first revocation list, wherein the first revocation list comprises an identifier of the certificate and the revocation time;
providing by the entity the first revocation list over the communication network to the end entity to trigger the end entity to perform a migration of the certificate to a new certificate before the certificate installed in the communication entity is revoked at the revocation time, and
responding by the entity to a key update request of the certificate by providing over the communication network a second end entity certificate signed by a private key corresponding to a new trust anchor certificate and the new trust anchor certificate.

7. The method according to claim 6, wherein the communication entity comprises an end entity, and the method further comprises
determining by the entity that all end entities in the communication network having an end entity certificate signed by a private key corresponding to the old trust anchor certificate have installed a respective second end entity certificate, wherein each of the second end entity certificates is signed by a private key corresponding to the new trust anchor certificate;
preparing, in response to it being determined that all the end entities have installed the respective second end entity certificates, a second revocation list by the end entity, wherein the second revocation list comprises an identifier of the second end entity certificates and the revocation time; and
providing the end entity the second revocation list over the communication network to the communication entity.

8. The method according to claim 6, wherein
the preparing of the first revocation list comprises including the identifier and the revocation time in an extension field of the first revocation list.

9. The method according to claim 6, wherein
the preparing of the first revocation list comprises including the identifier and the revocation time as an entry into a list of one or more revoked certificates of the first revocation list.

10. The method according to claim 9, further comprising
setting by the entity at least one of a reason code of the entry and an extension field of the entry such that the entry indicates that the revocation time is in the future.

11. A method, comprising
checking at a communication entity in a communication network whether an indication is received from an entity in the communication network that a first certificate in the communication entity is going to be revoked at a revocation time in the future, wherein the revocation time is received in a revocation list comprising an identifier of the first certificate, and wherein the revocation time in the future is assigned to the identifier of the first certificate; and
migrating, in response to the indication being received, by the communication entity the first certificate to a second certificate before the first certificate installed in the communication entity is revoked based on the revocation time, at least by:
requesting by the communication entity over the communication network an update of the first certificate;
installing the second certificate in the communication entity before the first certificate installed in the communication entity is revoked based on the revocation time;
installing an interim certificate at an installation time earlier than the revocation time such that the first certificate and the interim certificate are simultaneously valid between the installation time and the revocation time; and
installing the second certificate after the interim certificate was installed but before or at the revocation time.

12. The method according to claim 11, wherein
the identifier of the first certificate and the revocation time are included in an extension field of the revocation list.

13. The method according to claim 11, wherein
the identifier and the revocation time are included as an entry in a list of one or more revoked certificates.

14. The method according to claim 13, wherein
the checking whether the indication is received comprises checking whether at least one of a reason code of the entry and an extension field of the entry indicates that the revocation time is in the future.

15. The method according to claim 13, wherein
the method further comprises comparing an actual time and the revocation time; and
the checking whether the indication is received comprises considering that the indication is received in response to the revocation time being later than the actual time.

16. The method according to claim 11, wherein the migrating further comprises
requesting an update of the interim certificate at a time at or before the revocation time.

* * * * *